US009257125B2

(12) United States Patent  (10) Patent No.: US 9,257,125 B2
Yokoyama  (45) Date of Patent: Feb. 9, 2016

(54) AUDIO FRAME TIMING CORRECTION METHOD AND WIRELESS DEVICE

(75) Inventor: Shinji Yokoyama, Tokyo (JP)

(73) Assignee: Hitachi Kokusai Electric Inc. (JP)

( * ) Notice: Subject to any disclaimer, the term of this patent is extended or adjusted under 35 U.S.C. 154(b) by 272 days.

(21) Appl. No.: 13/983,132

(22) PCT Filed: Jan. 24, 2012

(86) PCT No.: PCT/JP2012/051417
§ 371 (c)(1),
(2), (4) Date: Aug. 1, 2013

(87) PCT Pub. No.: WO2012/105370
PCT Pub. Date: Aug. 9, 2012

(65) Prior Publication Data
US 2013/0317832 A1  Nov. 28, 2013

(30) Foreign Application Priority Data

Feb. 2, 2011 (JP) ................................. 2011-020683

(51) Int. Cl.
*G10L 19/00* (2013.01)
*H04J 3/06* (2006.01)
*H04W 52/02* (2009.01)

(52) U.S. Cl.
CPC ............. *G10L 19/0017* (2013.01); *G10L 19/00* (2013.01); *H04J 3/0632* (2013.01); *H04J 3/0685* (2013.01); *H04W 52/029* (2013.01)

(58) Field of Classification Search
CPC ..... G10L 19/00; G10L 19/005; G10L 19/022; G10L 19/025; G10L 19/03; G10L 19/032; G10L 19/167; H04J 3/06; H04J 3/062; H04J 3/0632; H04J 3/0635; H04W 56/00; H04W 56/0005; H04W 56/001; H04W 56/003; H04W 56/004; H04W 56/0055
USPC ............................ 704/500, 501, 502, 503, 504
See application file for complete search history.

(56) References Cited

U.S. PATENT DOCUMENTS 5,544,324 A *  8/1996  Edem et al. .................... 709/231
7,002,941 B1 *  2/2006  Treadaway et al. ............ 370/338
2009/0232499 A1 *  9/2009  Sarashina et al. ............... 398/63

FOREIGN PATENT DOCUMENTS

JP  2010-252019  11/2010

OTHER PUBLICATIONS

International Search Report.

* cited by examiner

*Primary Examiner* — Qi Han
(74) *Attorney, Agent, or Firm* — Bacon & Thomas, PLLC

(57) ABSTRACT

An audio frame timing correction method and a wireless device are provided. A controller generates a reference clock for audio coding/decoding such that the reference clock runs fast and moved forward within an audio data sampling interval with the remaining time becoming a margin of the interval. An audio codec decodes demodulated data based on the reference clock, and codes an audio signal based on the reference clock. A demodulator detects wireless frame deviation and determines an adjustment timing whereat the wireless frame symbol timing and the audio frame timing are corrected based on the deviation and the margin. Upon the adjustment timing, the controller synchronizes audio sampling timing with the wireless frame symbol timing.

6 Claims, 7 Drawing Sheets

SCHEMATIC BLOCK DIAGRAM OF MOBILE
STATION ACCORDING TO EMBODIMENT

FIG. 3A
WIRELESS FRAME — 5 | 6
WHEN AUDIO FRAME IS NOT ADJUSTED — 4 | 5
WHEN AUDIO FRAME IS ADJUSTED — 4 | 5
NOT NECESSARY TO ADJUST AUDIO FRAME TIMING TO BE SAME AS WIRELESS FRAME TIMING

CORRECTION OF WIRELESS FRAME TIMING

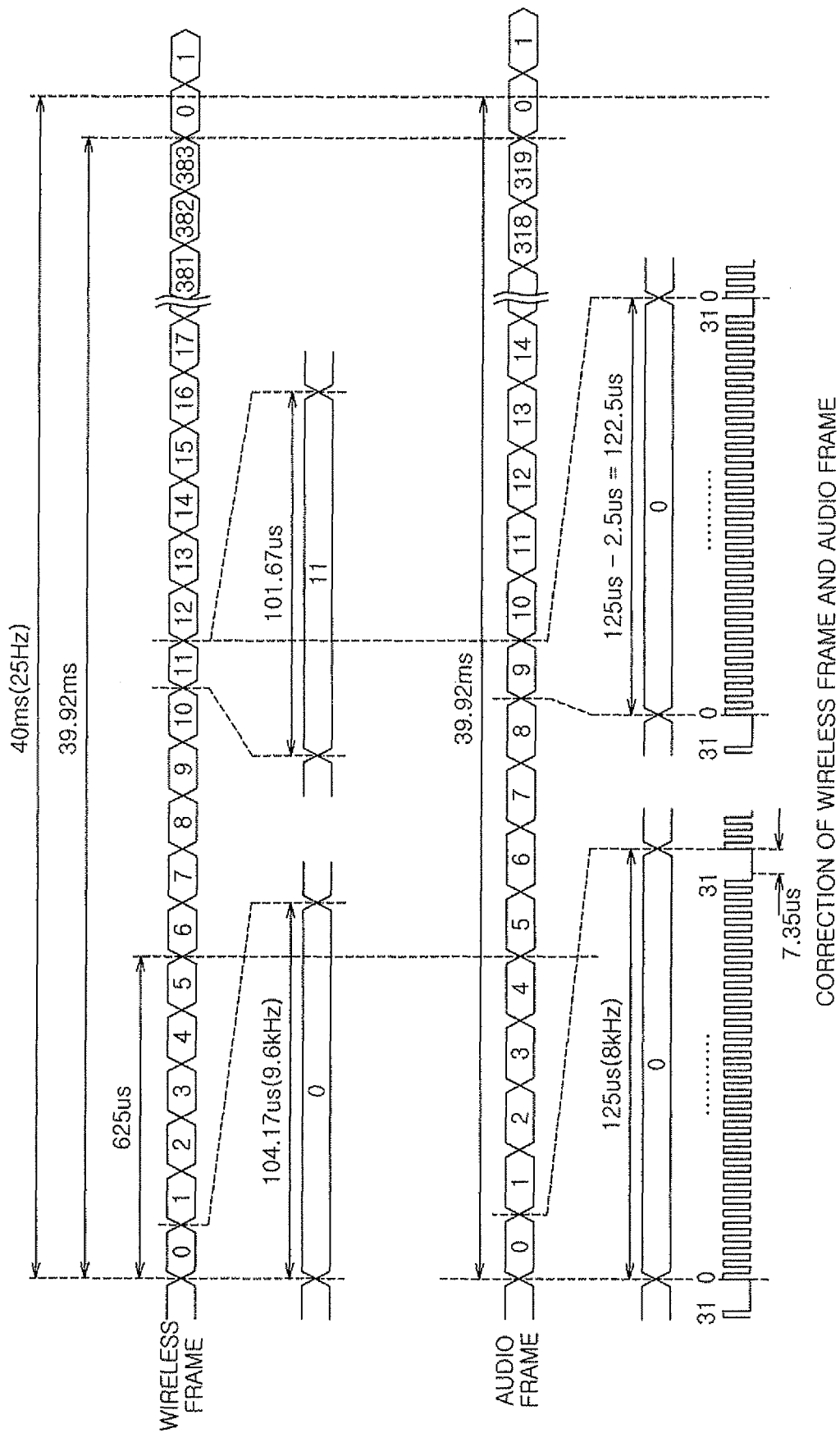

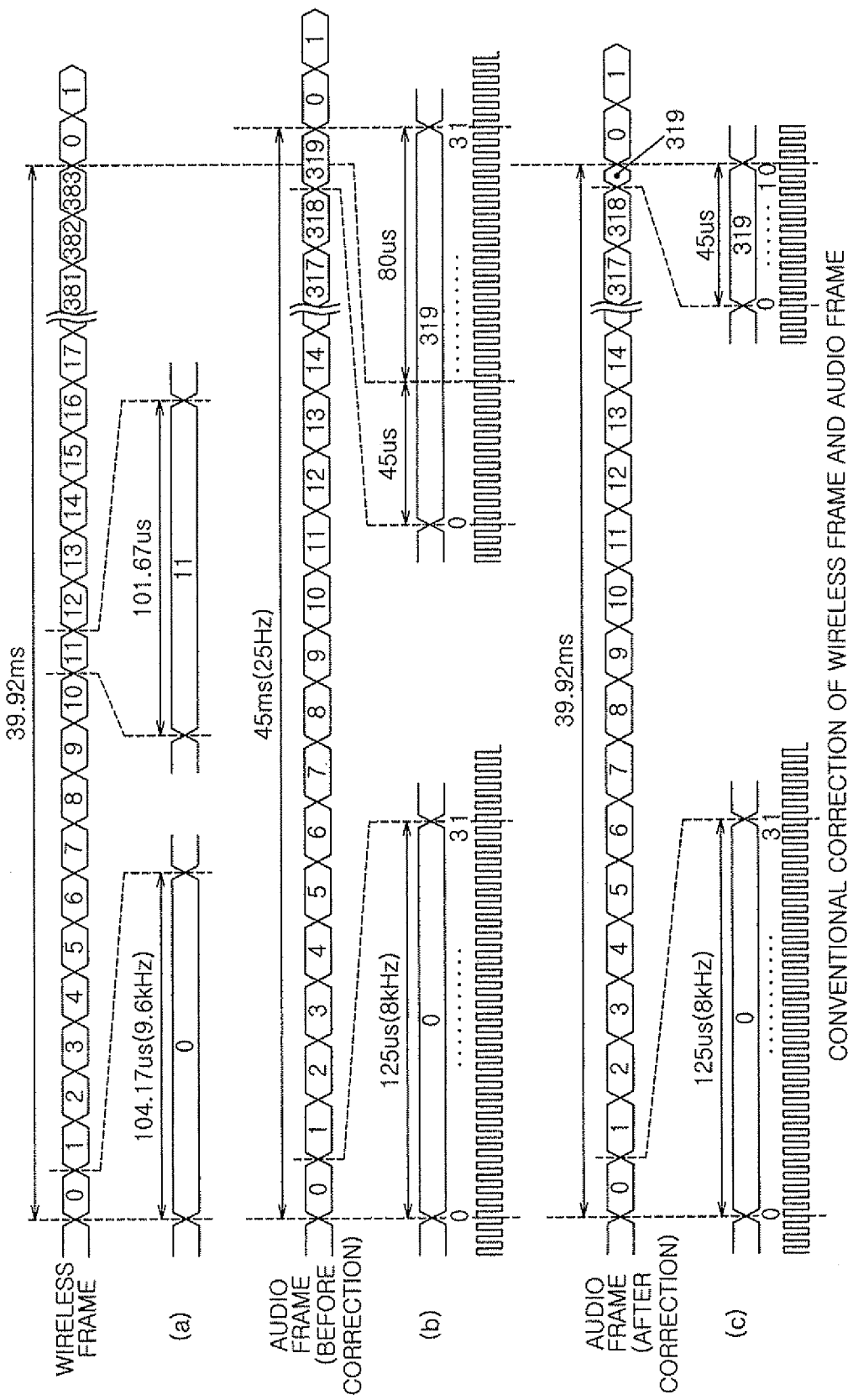

AUDIO FRAME TIMING CORRECTION METHOD AND WIRELESS DEVICE

FIELD OF THE INVENTION

The present invention relates to an audio frame timing correction method for correcting an audio frame timing in synchronization with a wireless frame timing of a wireless device, and a wireless device, and more particularly, to an audio frame timing correction method which is capable of easily preventing loss of audio data without increasing a circuit scale, and a wireless device.

BACKGROUND OF THE INVENTION

In mobile communications systems, when wireless communications are performed between a base station and a terminal (a mobile station) or between a terminal and another terminal, there is a need to synchronize a wireless frame timing between a transmitting side and a receiving side. For this purpose, if there occurs a deviation in the wireless frame timing, the terminal corrects the wireless frame timing for communications between the base station and the terminal and the receiving side corrects the wireless frame timing for communications between the terminals.

In audio communications, a transmitting side encodes audio data by an audio codec, modulates the encoded audio data, and transmits the modulated audio data by carrying them on a wireless frame. A receiving side decodes a received and demodulated wireless frame by an audio codec to extract the audio data. That is, there is a need to adjust a sampling timing in A/D or D/A conversion of the audio data in the audio codec to a wireless frame timing.

(Wireless Frame and Audio Frame)

Next, configurations of a wireless frame and an audio frame are described. The wireless frame includes 384 symbols, and one wireless frame is provided when a symbol timing counter counts 384 symbols. Then, the symbol timing counter is reset to "0" and then counts symbol timings of the next wireless frame. The wireless frame length is 40 ms, the wireless frame timing is 25 Hz, the symbol length is 104.17 µs, and the symbol timing is 9.6 kHz.

The audio frame in the audio codec includes 320 audio samples, and one audio frame is provided when an audio sampling counter counts 320 audio samples. Then, the audio sampling counter is reset to "0" and then counts a sample timing of the next audio frame. The audio frame length is 40 ms, the audio frame timing is 25 Hz, as in the wireless frame, the audio sample length (audio sampling interval) is 125 µs, and the audio sampling timing is 8 kHz. The audio codec operates by using an audio codec reference clock (256 kHz) to count 32 times within one audio sampling interval. The reference clock is supplied from a controller.

Here, since the audio frame timing needs to be adjusted to the wireless frame timing, a timing at which the audio sampling counter counts 320 audio samples and then is reset to "0" is adjusted to a timing at which the symbol timing counter counts 384 symbols and then is reset to "0."

In addition, a clock (19.2 MHz) is provided in the wireless device as the general reference clock of the entire device. Counters and clocks for various parts are generated by dividing the reference clock. The symbol timing corresponds to 2000 counts of 19.2 MHz and the audio sampling timing corresponds to 2400 counts of 19.2 MHz.

(Conventional Audio Frame Timing Correction Method: FIG. 5)

Next, a conventional audio frame timing correction method will be described with reference to FIG. 5. FIG. 5 is a view for explaining a conventional audio frame timing correction method. (a) of FIG. 5 shows a wireless frame having a deviated timing, (b) of FIG. 5 shows an audio frame before correction, and (c) of FIG. 5 shows an audio frame after correction. In particular, (a) of FIG. 5 shows a case where a wireless frame timing of a wire device leads a timing of a counterpart performing wireless communications by 2.5 µs every 12 symbol timings. In this case, the wireless frame is required to be shortened by 2.5 µs every 12 symbol timings.

To this end, the symbol length is shortened by 2.5 µs every 12 symbol timings (count 11, count 23, count 35, . . . ). Specifically, a symbol clock is outputted earlier by 2.5 µs every 12 symbol timings. That is, 2.5 µs/(1/19.2 MHz)=48 clocks and correction is made to absorb the deviation by incrementing the symbol counter to count the next symbol timing at a timing earlier by 48 clocks of 19.2 MHz every 12 symbols.

Accordingly, while the symbol counter counts 384 symbols, time is saved by 80 µs (=2.5 µs×(384/12)) and one wireless frame length becomes 39.92 ms (=40 ms−80 µs).

In addition, as shown in (b) of FIG. 5, when the symbol timing counter of the wireless frame counts 384 symbols and then is reset to "0," after the audio sampling counter of the audio frame counts 319 audio samples, an interval for 320th count elapses just 45 µs and the audio frame length does not reach 40 ms. If the audio sampling timing is counted based on the audio codec reference clock as it stands, 80 µs has to elapse more to start the next audio frame.

As described above, since the audio frame timing needs to be synchronized with the wireless frame timing, at the 320-th audio sampling timing, the audio sampling counter is reset to "0" and begins to count the next audio frame at the point of time when 45 µs elapses, as shown in (c) of FIG. 5. That is, the remaining data corresponding to 80 µs at the 320-th audio sampling timing are lost.

When an interface with the audio codec operates at clocks of, e.g., 256 kHz, 21 clocks (=80 µs/(1/256 kHz)=20.48) are lost.

Some audio codec devices may not operate normally or may destroy data in the unit of audio frame even when one reference clock is lost. Such an audio codec device has a problem of abnormal audio or audio disconnection. In addition, if there are data in synchronization with the reference clock, the data may be lost in time for the reference clock, which may result in audio disconnection.

To avoid the data loss, it may be considered that audio-encoded/decoded data are first buffered and are outputted without making adjustment of the reference clock. However, this may result in increase of a circuit scale, delay of audio data and difficulty in timing adjustment.

(Related Technique)

As one of techniques for correcting an audio data timing in wireless communications, there has been proposed a "wireless base station" disclosed in Japanese Publication Application No. 2010-252019 (JP2010-252019A) (by Hitachi Kokusai Electronic Inc.). JP2010-252019A discloses technique of allocating an uplink frame of audio data by a converter, detecting temporal change in the audio data by comparing time information of the audio data with time information of an audio control signal from a network by a correction processor, and correcting the allocation timing of the uplink frame of the audio data in the converter based on the temporal change.

However, the conventional audio frame timing correction method and wireless device have problems in that audio data are lost due to shortening of a wireless frame resulting from a deviation of the wireless frame timing from that of a counterpart, which may result in abnormal audio and audio disconnection.

In addition, the conventional audio frame timing correction method and wireless device have another problem of increase in a circuit scale and complicated control of timing adjustment in an audio-encoded/decoded data buffering configuration.

SUMMARY OF THE INVENTION

In view of the above, the present invention provides an audio frame timing correction method and a wireless device capable of preventing introduction of abnormal audio and audio disconnection with a simple control, without increasing a circuit scale.

In accordance with an aspect of the present invention, there is provided an audio frame timing correction method for correcting an audio frame timing based on a wireless frame timing. The method includes: determining an adjustment timing at which correction for synchronizing an audio data counting timing of an audio frame with a symbol counting timing of a wireless frame is performed; making a reference clock for encoding or decoding audio data to run fast and be moved forward within an audio data counting interval to form a remaining time within the audio data counting interval as timing correctable margin of the time interval; decoding or encoding the audio data with the reference clock moved forward to form the margin of the time interval; and synchronizing the audio data counting timing of the audio frame with the symbol counting timing of the wireless frame when the adjustment timing arrives.

The audio frame timing correction method further includes: detecting a wireless frame deviation; determining the adjustment timing based on the deviation; correcting the symbol counting timing of the wireless frame based on the deviation; and synchronizing the audio frame timing with the corrected the wireless frame timing.

In accordance with another aspect of the present invention, there is provided a wireless device which demodulates a received wireless signal and decodes demodulated audio data. The wireless device includes: a controller configured to generate a symbol timing of a wireless frame and an audio data sampling timing of an audio frame, store the demodulated audio data, make a reference clock for decoding the audio data to run fast and be moved forward within an audio data counting interval to form a remaining time within the audio data counting interval as a timing correctable margin of the time interval, and output the reference clock moved forward to form the margin of the time interval and the stored audio data at the audio data counting timing of the audio frame.

The wireless device further includes a demodulator configured to detect a symbol timing of a wireless frame of the received wireless signal, detect a wireless frame deviation by comparing the detected symbol timing of the wireless frame with the symbol timing of the wireless frame generated by the controller, determine an adjustment timing to correct the audio frame timing based on the deviation, correct the symbol counting timing of the wireless frame based on the deviation, demodulate the wireless signal, and output the demodulated audio data to the controller; and an audio data decoder configured to receive the audio data and the reference clock moved forward to form the margin of the time interval from the controller, and decode the audio data with the reference clock.

The controller synchronizes the audio data counting timing of the audio frame with the corrected symbol counting timing of the wireless frame when the adjustment timing determined by the demodulator arrives.

The wireless device further includes: an audio data encoder configured to encode an audio signal with a reference clock to output the audio data; and a modulator configured to modulate the encoded audio data to output the modulated audio data in a wireless frame.

The controller makes the reference clock for encoding the audio data to run fast and be moved forward within an audio data counting interval to form a remaining time within the audio data counting interval as a timing correctable margin of the time interval, outputs the reference clock moved forward to form the margin of the time interval to the audio data encoder, stores the audio data outputted from the audio data encoder, outputs the stored audio data at an audio data counting timing of an audio frame, and synchronizes the audio data counting timing of the audio frame with the symbol counting timing of the wireless frame when the adjustment timing determined by the demodulator arrives.

EFFECT OF THE INVENTION

The present invention provides an audio frame timing correction method for correcting an audio frame timing based on a wireless frame timing. The method includes: determining an adjustment timing at which correction for synchronizing an audio data counting timing of an audio frame with a symbol counting timing of a wireless frame is performed; making a reference clock for encoding or decoding audio data to run fast and be moved forward within an audio data counting interval to form a remaining time within the audio data counting interval as timing correctable margin of the time interval; decoding or encoding the audio data with the reference clock moved forward to form the margin of the time interval; and synchronizing the audio data counting timing of the audio frame with the symbol counting timing of the wireless frame when the adjustment timing arrives.

With this configuration, the adjustment timing can be properly determined to correct a timing deviation to fall within the margin of the time interval including no audio data. Accordingly, without increasing a circuit scale, it is possible to prevent delay or missing of the audio data in the audio frame timing adjustment with a simple control, which can result in prevention of deterioration of audio quality.

Further, the audio frame timing correction method further includes: detecting a wireless frame deviation; determining the adjustment timing based on the deviation; correcting the symbol counting timing of the wireless frame based on the deviation; and synchronizing the audio frame timing with the corrected the wireless frame timing.

With this configuration, even when there occurs a deviation in the wireless frame, the audio frame timing can be adjusted to the wireless frame timing, which can result in prevention of deterioration of audio quality.

In addition, the present invention provides a wireless device which demodulates a received wireless signal and decodes demodulated audio data. The wireless device includes: a controller configured to generate a symbol timing of a wireless frame and an audio data sampling timing of an audio frame, store the demodulated audio data, make a reference clock for decoding the audio data to run fast and be moved forward within an audio data counting interval to form a remaining time within the audio data counting interval as a timing correctable margin of the time interval, and output the reference clock moved forward to form the margin of the time interval and the stored audio data at the audio data counting timing of the audio frame.

The wireless device further includes a demodulator configured to detect a symbol timing of a wireless frame of the received wireless signal, detect a wireless frame deviation by comparing the detected symbol timing of the wireless frame with the symbol timing of the wireless frame generated by the controller, determine an adjustment timing to correct the audio frame timing based on the deviation, correct the symbol counting timing of the wireless frame based on the deviation, demodulate the wireless signal, and output the demodulated audio data to the controller; and an audio data decoder configured to receive the audio data and the reference clock moved forward to form the margin of the time interval from the controller, and decode the audio data with the reference clock.

The controller synchronizes the audio data counting timing of the audio frame with the corrected symbol counting timing of the wireless frame when the adjustment timing determined by the demodulator arrives.

With this configuration, the adjustment timing can be properly determined to correct a timing deviation to fall within the margin of the time interval including no audio data. Accordingly, without increasing a circuit scale, it is possible to prevent delay or missing of the audio data in the audio frame timing adjustment with a simple control, which can result in prevention of deterioration of audio quality.

Furthermore, the wireless device further includes: an audio data encoder configured to encode an audio signal with a reference clock to output the audio data; and a modulator configured to modulate the encoded audio data to output the modulated audio data in a wireless frame.

The controller makes the reference clock for encoding the audio data to run fast and be moved forward within an audio data counting interval to form a remaining time within the audio data counting interval as a timing correctable margin of the time interval, outputs the reference clock moved forward to form the margin of the time interval to the audio data encoder, stores the audio data outputted from the audio data encoder, outputs the stored audio data at an audio data counting timing of an audio frame, and synchronizes the audio data counting timing of the audio frame with the symbol counting timing of the wireless frame when the adjustment timing determined by the demodulator arrives.

With this configuration, even at a transmitting stage, it is possible to prevent delay or missing of the audio data in the audio frame timing adjustment with a simple control, which can result in prevention of deterioration of audio quality.

BRIEF DESCRIPTION OF THE DRAWINGS

FIGS. 3A to 3C are schematic views for explaining an audio sampling timing adjustment method in the wireless device.

FIG. 4 is a view for explaining timing corrections in wireless frame and audio frame in the wireless device.

FIG. 5 is a view for explaining a conventional audio frame timing correction method.

DETAILED DESCRIPTION OF THE EMBODIMENTS

Figure 1:
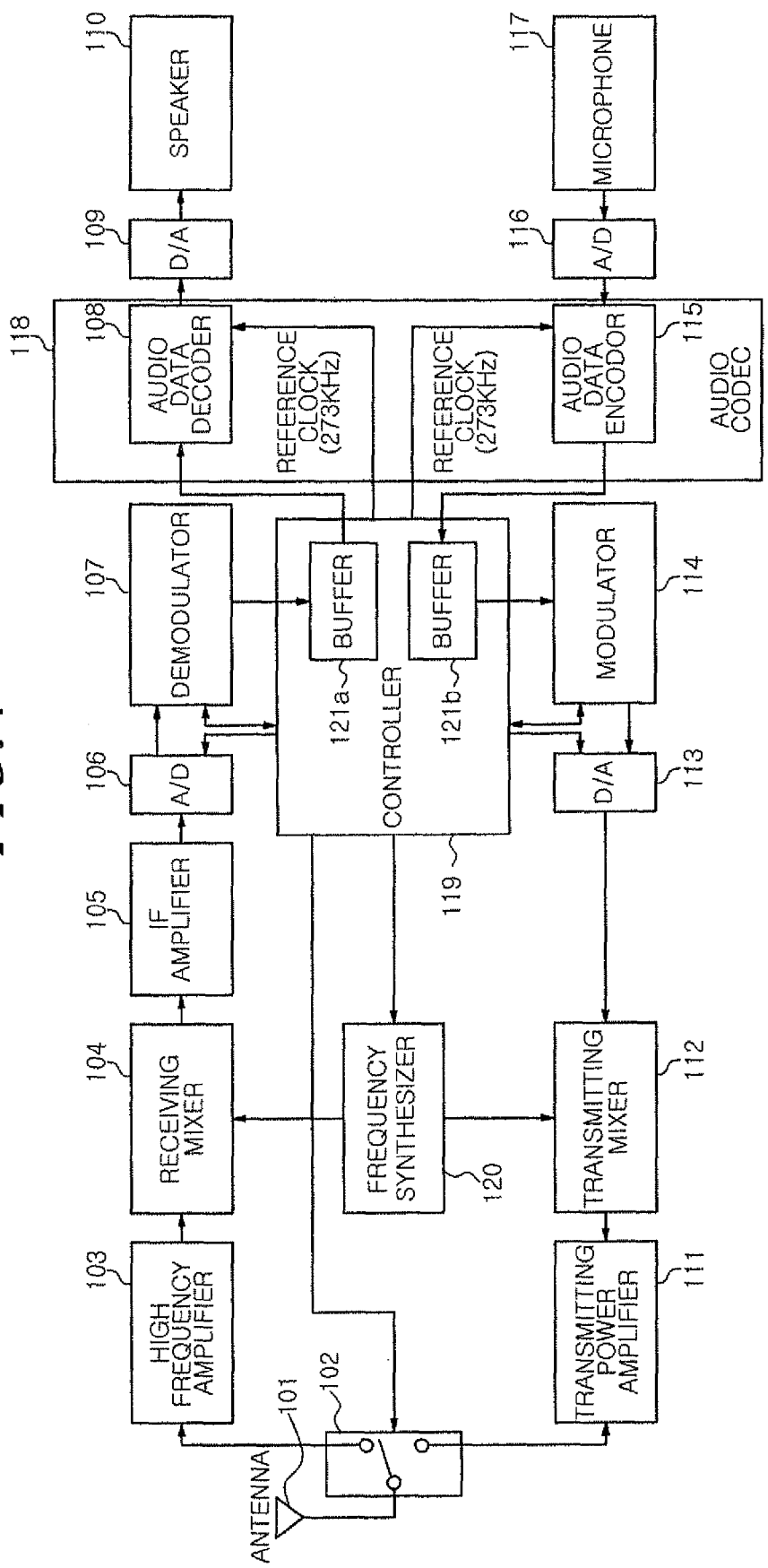
FIG. 1 is a schematic block diagram of a wireless device in accordance with an embodiment of the present invention.

Hereinafter, embodiments of the present invention will be described with reference to the accompanying drawings.

(Outline of Embodiments)

An audio frame timing correction method in accordance with an embodiment of the present invention generates a reference clock of an audio decoding/encoding process such that the reference clock runs fast and moved forward within an audio data sampling interval, with the remaining time becoming a margin of the time interval, decodes demodulated data based on the reference clock, encodes an audio signal based on the reference clock, detects a deviation in the wireless frame, determines the audio frame timing correction frequency and its adjustment timing based on the deviation and the margin of the time interval, and synchronizes the audio frame sampling timing with the wireless frame symbol timing when the adjustment timing arrives. With this configuration, even when an audio sampling interval is set to be shortened, the adjustment timing can be properly determined to correct a timing deviation to fall within the margin of the time interval including no audio data. Accordingly, without increasing a circuit scale, it is possible to prevent missing of the audio data with a simple control, which results in the audio frame timing being synchronized with the wireless frame timing.

The audio frame timing correction method in accordance with the embodiment of the present invention includes: determining a correction frequency and an adjustment timing to perform correction to synchronize an audio frame timing with a wireless frame timing when a deviation in the wireless frame occurs; generating a fast reference clock, which is counted by a specific number to encode or decode audio data, to be moved forward within a preset sampling interval of the audio data and be counted; forming a remaining time within the sampling interval (time for which the reference clock is not counted) as a timing correctable margin of the time interval; decoding or encoding the audio data with the reference clock moved forward; correcting symbol timing of the wireless frame when the adjustment timing arrives; and synchronizing the audio sampling timing of the audio frame with the symbol timing of the wireless frame. With this configuration, as the correction frequency is determined such that the one-time correction amount at the adjustment timing falls within the margin of the time interval, even when an audio sampling interval is set to be shortened, it is possible to prevent missing of the audio data, and, without increasing a circuit scale, it is possible to realize an audio frame timing adjustment with a simple process, which can result in improved communications reliability.

A wireless device includes: a controller configured to generate a symbol timing of a wireless frame and a sampling timing of an audio frame, store demodulated audio data, generate a fast reference clock for decoding audio data to be moved forward within a sampling interval of audio data and be counted, form a remaining time within the sampling interval as a timing correctable margin of the time interval, and output the reference clock having the margin of the time interval formed therein and the stored audio data; a demodulator configured to detect the symbol timing of the wireless frame of the received wireless signal, detect a deviation of the wireless frame by comparing the detected symbol timing with a symbol timing of wireless frame generated by the controller, determine an audio frame correction frequency and an adjustment timing based on the deviation, correct deviation of the symbol timing at the adjustment timing, output the adjusted symbol timing and demodulate the wireless signal, and output the demodulated audio data to the controller; and an audio data decoder configured to input the audio data and the reference clock having the margin of the time interval formed therein from the controller, and decode the audio data with the reference clock. The controller synchronizes the audio sampling timing of the audio frame with the corrected symbol timing of the wireless frame when the adjustment timing determined by the demodulator arrives. With this configuration, as the correction frequency is determined such that the one-time correction amount at the adjustment timing falls within the margin of the time interval, even when an audio sampling interval is set to be shortened, it is possible to prevent missing of the audio data, and, without increasing a circuit scale, it is possible to realize an audio frame timing adjustment at a receiving stage with a simple process, which can result in improved communications reliability.

Further, a wireless device includes: an audio data encoder configured to encode the audio signal with a reference clock providing a margin of the time interval formed therein and output audio data; and a controller configured to generate the fast reference clock for encoding audio data to be moved forward within a sampling interval of the audio data and be counted, form a remaining time within the sampling interval as the timing correctable margin in the time interval, output the reference clock having the margin of the time interval formed therein to the audio data encoder, store the audio data from the audio data encoder and output the stored audio data at the sampling timing of the audio data. The wireless device synchronizes the audio sampling timing of the audio frame with the symbol timing of the wireless frame corrected and outputted from a modulator when an adjustment timing determined by the modulator arrives. With this configuration, without increasing a circuit scale, it is possible to realize an audio frame timing adjustment at a transmitting stage with a simple process, which can result in improved communications reliability.

(Configuration of Wireless Device in Accordance with the Embodiment of the Present Invention: FIG. 1)

A configuration of a wireless device in accordance with an embodiment of the present invention is described with reference to FIG. 1. FIG. 1 is a schematic block diagram showing the configuration of the wireless device in accordance with the embodiment of the present invention. The wireless device in accordance with the present embodiment is a mobile station in a wireless communications system and includes an antenna 101, an antenna switch 102, a high frequency amplifier 103, a receiving mixer 104, an IF amplifier 105, an A/D converter 106, a demodulator 107, an audio codec 118, a D/A converter 109, a speaker 110, a transmitting power amplifier 111, a transmitting mixer 112, a D/A converter 113, a modulator 114, an A/D converter 116, a microphone 117, a controller 119 and a frequency synthesizer 120. The audio codec 118 includes an audio data decoder 108 and an audio data encoder 115.

The units of the wireless device are described in detail. The antenna 101 receives a wireless signal in the air and emits a transmitting signal into the air. The antenna switch 102 connects the antenna 101 to a transmitting side (the transmitting power amplifier 111) or a receiving side (the high frequency amplifier 103). The high frequency amplifier 103 amplifies a received high frequency signal. The receiving mixer 104 multiplies the high frequency signal with a frequency from the frequency synthesizer 120 to generate an intermediate frequency (IF) signal. The frequency synthesizer 120 outputs a specific frequency signal in accordance with an instruction from the controller 119.

The IF amplifier 105 amplifies the IF signal. The A/D converter 106 converts the amplified IF signal to a digital signal based on a clock specified by the controller 119. The demodulator 107 demodulates the digital signal. In addition, the demodulator 107 detects a wireless frame based on received data and informs the controller 119 of the detected wireless frame timing. The wireless device is characterized in that the demodulator 107 compares a symbol timing of the detected wireless frame with a symbol timing of its own wireless frame inputted from the controller, to detect a deviation between the wireless frames, and determines an adjustment timing at which the symbol timing of the wireless frame and the audio sampling timing of the audio frame are adjusted and a frequency of the adjustment timings based on an amount of the deviation detected. When the adjustment timing arrives, a correction to the symbol timing of the wireless frame is performed as conventional.

The audio codec 118 decodes received audio data by using the audio data decoder 108 and encodes transmitting audio data by using the audio data encoder 115. In the wireless device, the audio codec 118 performs a process based on a forward-moved reference clock supplied from the controller 119. The forward-moved reference clock will be described in detail later. The D/A converter 109 converts the decoded audio data to analog data. The speaker 110 outputs received audio data.

The microphone 117 inputs an audio signal to be transmitted. The A/D converter 116 converts the audio signal into a digital format. The modulator 114 modulates encoded audio data. The D/A converter 113 converts the modulated audio data into an analog format to generate an IF signal. The transmitting mixer 112 multiplies the IF signal with a frequency signal from the frequency synthesizer 120 to upconvert the IF signal to a transmitting frequency. The transmitting power amplifier 111 amplifies the transmitting signal.

The controller 119 may be implemented by FPGA (Field Programmable Gate Array) or the like and controls the overall operation of the device and is characterized in correcting the audio frame timing to be synchronized with the wireless frame timing. In addition, the controller 119 generates a reference clock of the audio codec to run fast and to be moved forward within the sampling interval and outputs this reference clock to the audio codec 108, which characterizes the wireless device in accordance with the present embodiment. Then, upon receiving deviation in wireless frame deviation and adjustment timing from the demodulator 107, the controller 119 corrects the audio sampling timing to synchronize the audio sampling timing with a symbol timing inputted from the demodulator within each adjustment timing interval, which characterizes the wireless device.

In addition, the controller 119 includes a buffer 121a storing the demodulated data and a buffer 121b storing the encoded audio data to be transmitted. The controller 119 stores the demodulated data, which are inputted from the demodulator 107, in the buffer 121a, and outputs the demodulated data in the buffer 121a to the audio data decoder 108 of the audio codec 118 in synchronization with the symbol timing of the wireless frame inputted from the demodulator 107 when a set adjustment timing arrives.

In addition, the controller 119 inputs the encoded audio data from the audio data encoder 115 of the audio codec 118 into the buffer 121b, and outputs the encoded data in the buffer 121b to the modulator 114 in synchronization with the symbol timing of the wireless frame inputted from the demodulator 107 when the set adjustment timing arrives. An operation of the timing adjustment of the audio frame will be described in detail later.

(General Operation: FIG. 1)

An operation of the wireless device is described in brief. In the wireless device, at a receiving stage, a signal from a base station or a different mobile station is received through the antenna 101, is amplified by the high frequency amplifier 103 via the antenna switch 102, and is then converted into the intermediate frequency (IF) signal by the receiving mixer 104. The receiving frequency is set by controlling the frequency synthesizer 120 by the controller 119.

The IF signal outputted from the receiving mixer 104 is converted to a digital signal by the A/D converter 105, is demodulated by the demodulator 107, and is then first stored in the buffer 121*a* of the controller 119. Thereafter, the stored signal is outputted to the audio codec 118 at a predetermined timing and is decoded in the audio codec 118 to be converted to digital audio data. The digital audio data is converted to an analog audio signal by the D/A converter 109 and is then outputted through the speaker 110. Timing controls to the above functional blocks are executed by the controller 119.

At a transmitting stage, an analog audio signal inputted from the microphone 117 is converted to digital audio data by the A/D converter 116 and is then encoded by the audio codec 118. The encoded signal is inputted to the buffer 121*b* of the controller 119 and is then outputted to the modulator 114 at a predetermined timing to be modulated.

The modulated data is converted to an analog signal by the D/A converter 113 and is then converted to a high frequency signal by the transmitting mixer 112. The transmitting frequency is set by controlling the frequency synthesizer 120. The high frequency signal is amplified by the transmitting power amplifier 111 and is then emitted from the antenna 101 into the air via the antenna switch 102. Timing controls to the above functional blocks are executed by the controller 119.

The wireless device is characterized in the control of a timing when the demodulated data stored in the buffer 121*a* of the controller 119 is outputted to the audio data decoder 108 of the audio codec 118 at the receiving stage and the control of a timing when data, encoded by the audio data encoder 115 and stored in the buffer 121*b* of the controller 119, is outputted to the modulator 114 at the transmitting stage. The timing control related to the audio codec (timing correction of the audio frame) will be described in detail later.

Figure 2:
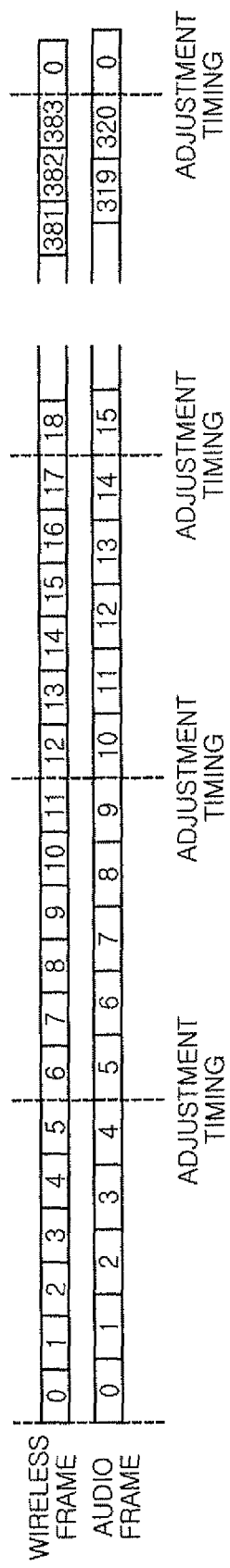
FIG. 2 is a view for explaining adjustment timings of wireless frame and audio frame in the wireless device.

(Adjustment Timing of Wireless Frame and Audio Frame: FIG. 2)

Next, the adjustment timing of the wireless frame and the audio frame in the wireless device will be described with reference to FIG. 2. FIG. 2 is a view for explaining the adjustment timing of the wireless frame and the audio frame in the wireless device. In the wireless device, it is here assumed that a wireless frame length and an audio frame length are respectively 40 ms (a wireless frame timing and an audio frame timing are respectively 25 Hz), a symbol length (symbol interval) is 104.17 µs (a symbol timing is 9.6 kHz), and an audio sampling length (audio sample interval) is 125 µs (an audio sampling timing is 8 kHz), same as in the conventional device. The symbol timing and the audio sampling timing are generated by the controller 119 based on a clock of 19.2 MHz.

As shown in FIG. 2, if there is no deviation between the wireless frame and the audio frame, a count timing of every six counts by a symbol timing counter of the wireless frame coincides with a count timing of every five counts by an audio sampling counter of the audio frame. Thus, in the example of FIG. 2, an adjustment timing for timing correction is set every six symbol timings for the wireless frame and every five audio sampling timings for the audio frame. The six-symbol timing is 625 µs (=104.17 µs×6) and the five-audio sampling timing is 625 µs (=125 µs×5), i.e., in the wireless device, audio sampling timing correction is performed to adjust (synchronize) the audio sampling timing to the wireless frame symbol timing every 625 µs.

In addition, in the wireless device, under the presumption that a symbol timing of a wireless frame is deviated from that of a communications counterpart, the deviation of the symbol timing of the wireless frame is corrected at each adjustment timing while performing correction to adjust the audio sampling timing to the corrected symbol timing.

That is, the symbol timing correction of the wireless frame is performed during a corresponding period every six symbol timings (e.g., counting of 5, 11, 17, . . . ) and the audio sampling timing correction is performed during a corresponding period every five audio sampling timings (e.g., counting of 4, 9, 14, . . . ). In addition, for the wireless frame, correction of the symbol timing may be performed at other occasions than the adjustment timing. Details of the timing adjustment method will be described later.

As described above, since the audio frame adjustment timing is determined by the demodulator 107 based on the detected deviation of the wireless frame, the audio frame adjustment timing is, in actuality, corrected every six-symbol timings of the wireless frame (625 µs) for the most frequent correction. However, if the deviation is small, the audio frame adjustment timing is corrected with the less correction frequency of, e.g., every 12 symbol timings or every 18 symbol timings of the wireless frame. The determination of the adjustment timing will be described in detail later.

Figure 3B:
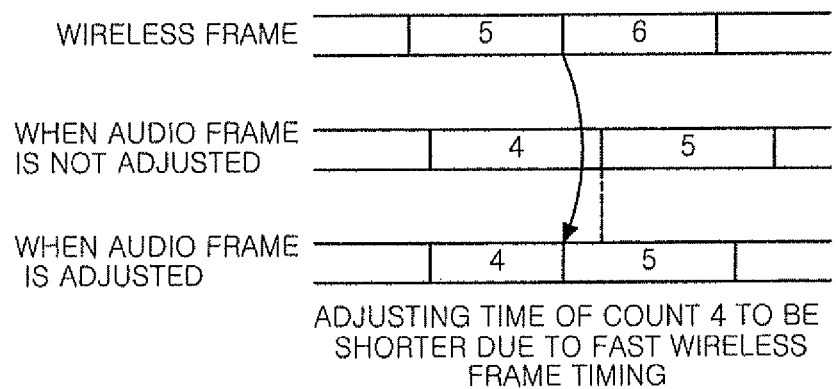
Figure 3C:
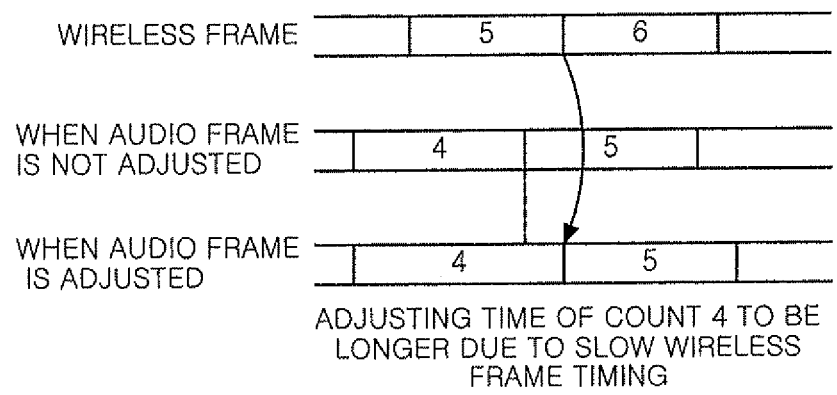

(Audio Sampling Timing Adjustment: FIGS. 3A to 3C)

Next, a method of adjusting the audio sampling timing in the wireless device will be described in brief. FIGS. 3A to 3C are schematic explanatory views of the audio sampling timing adjustment method in the wireless device. As described above, the controller 119 of the wireless device performs the correction (adjustment) to adjust the audio sampling timing to the wireless frame symbol timing at a particular adjustment timing (every 625 µs in this example).

(Case where Wireless Frame Timing Coincides with Audio Frame Timing)

FIG. 3A shows a case where the wireless frame timing coincides with the audio frame timing. In this case, a timing at which a sixth symbol timing (i.e., count 5) of the wireless frame is ended to start a seventh symbol timing (i.e., count 6) coincides with a timing at which a fifth audio sampling timing (i.e., count 4) of the audio frame is ended to start a sixth audio sampling timing (i.e., count 5). Therefore, there is no need to adjust the audio sampling timing in the audio frame.

(Case where Wireless Frame Timing Leads)

FIG. 3B shows a case where the wireless frame timing leads (or arrives earlier than) the audio frame timing. In this case, as indicated by "when audio frame is not adjusted" in FIG. 3B, a timing at which a sixth symbol timing (i.e., count 5) of the wireless frame is ended to start a seventh symbol timing (i.e., count 6) leads a timing at which a fifth audio sampling timing (i.e., count 4) of the audio frame is ended to start a sixth audio sampling timing (i.e., count 5).

Then, the controller 119 of the wireless device adjusts the fifth audio sampling timing (count 4), i.e., the adjustment timing of the audio frame, to be shortened to absorb the deviation such that the timing corresponding to the seventh symbol timing (count 6) of the wireless frame coincides with the timing corresponding to the sixth audio sampling timing (count 5) of the audio frame. No adjustment is performed at an audio sampling timing before it becomes the adjustment timing.

Here, in the audio frame timing correction method in the wireless device, the reference clock is set to run faster than the conventional reference clock and is forward moved within an audio sampling interval to output the demodulated data to the audio codec 118, which results in the margin of the time interval provided in a rear end of each audio sampling interval (time for which no data input/output is performed). Since the margin of the time interval includes no audio data, if such reduction is within the margin of the time interval, there occurs no audio data missing even when the audio frame sample length is shortened, as opposed to the conventional techniques. This operation will be described in more detail later.

(Case where Wireless Frame Timing Lags)

FIG. 3c shows a case where the wireless frame timing lags (or arrives later than) the audio frame timing. In this case, as indicated by "case where audio frame is not adjusted" in FIG. 3c, a timing at which a sixth symbol timing (i.e., count 5) of the wireless frame is ended to start a seventh symbol timing (i.e., count 6) lags a timing at which a fifth audio sampling timing (i.e., count 4) of the audio frame is ended to start a sixth audio sampling timing (i.e., count 5).

Then, the controller 119 adjusts the fifth audio sampling timing (count 4) of the audio frame to be made longer by the deviated time such that the timing corresponding to the seventh symbol timing (count 6) of the wireless frame coincides with the timing corresponding to the sixth audio sampling timing (count 5) of the audio frame. This can prevent audio data from missing. Thus, the audio sampling timing adjustment in the wireless device is performed.

(Correction of Wireless Frame and Audio Frame in Wireless Device: FIG. 4)

Next, wireless frame and audio frame timing correction in the wireless device will be described with reference to FIG. 4. FIG. 4 is a view for explaining the wireless frame and audio frame timing corrections in the wireless device. FIG. 4 shows a case where a wireless frame timing leads a timing of a counterpart performing wireless communications by 2.5 µs every 12 symbols, as the conventional example shown in FIG. 5.

The example of FIG. 4 shows a smaller deviation than those shown in FIGS. 2 to 3C. In the example of FIG. 4, the adjustment timing corresponds to every 12 symbol timings in the wireless frame and every 10 audio sampling timings in the audio frame. That is, symbol timing correction of the wireless frame and audio sampling timing correction of the audio frame are performed at the 12-symbol timings in the wireless frame and the 10-audio sampling timings in the audio frame, respectively. The adjustment timing is determined by the demodulator 107 and is sent to the controller 119.

Under the above conditions, although one wireless frame length is 40 ms (25 Hz) and one symbol length is 104.17 µs (9.6 kHz) in general, the symbol length needs to be shortened by 2.5 µs every 12 symbol timings (count 11, 23, 35, . . . ) of the wireless frame.

Accordingly, while each symbol length is 104.17 µs at count 0 to count 10 of the symbol timing, the symbol timing is less counted by 48 clocks (2.5 µs) of 19.2 MHz at count 11 of the symbol timing. The same adjustment process is performed 32 times for one wireless frame, which results in the frame length of 39.92 ms. This process is performed by the demodulator 107 as in a conventional device.

Next, audio sampling timing correction will be described. A reference clock of the audio codec which is a characteristic part of the wireless device in the present invention will be here described. The reference clock of the audio codec of the wireless device (hereinafter abbreviated "the reference clock") is 272 kHz, which runs faster than a conventional reference clock (256 kHz). The reference clock is forward-moved to be counted within the sampling interval, and then, the reference clock is not counted in the rear end of the sampling interval. The number of counts is 32 as in a conventional device. The audio codec 118 performs data input/output, encoding and decoding based on the forward-moved reference clock supplied from the controller 119.

That is, a time for which the reference clock for input/output of audio data is counted within one audio sampling interval becomes shorter than a conventional case, and a time for which no input/output is performed (margin of the time interval) occurs per one audio sampling timing.

The margin of the time interval becomes 7.35 µs (=125 µs−(1/272 kHz)×32) per one sampling timing. Audio data are not included in the margin of the time interval and the clock counts may be lost with no problem within the margin of the time interval. In the wireless device, this margin of the time interval is used to perform the audio sampling timing correction.

Further, although the margin of the time interval occurs at each audio sampling timing, since the adjustment timing designated by the demodulator 107 is actually corrected, there is a timing correctable time of 7.35 µs per 10-audio sampling timing (1250 [125×10] µs) in the example of FIG. 4. On the other hand, for the adjustment timing shown in FIG. 2, there occurs the timing correctable time of 7.35 µs per 5-audio sampling timing (625(125×5) µs).

Further, if the wireless frame is deviated as described above, the controller 119 performs the audio frame timing correction in compliance with the corrected wireless frame. As described above, although one audio frame length is 40 ms (25 Hz) and one sample length is 125 µs (8 kHz) in general, the sample length needs to be shortened by 2.5 µs every 10 audio sampling timings (count 9, 19, 29, . . . ) in compliance with the corrected wireless frame.

In the example of FIG. 4, each sample length of the audio sampling is 125 µs at count 0 to count 8 of the audio sampling timing, but a rear end of the audio sampling is reduced by 2.5 µs at count 9 of the audio sampling timing, i.e., at the adjustment timing, and thus the sample length becomes 122.5 µs (=125 µs−2.5 µs). A missing part is within the margin of the time interval and does not affect the quality of the audio data.

In actuality, at the adjustment timing, the controller 119 waits for a corrected symbol timing from the demodulator 107, and, upon receiving the symbol timing, begins to count with the next audio sampling timing in synchronization with the symbol timing while outputting demodulated data to the audio codec 118. As a result, the sample length of the adjustment timing is reduced by 2.5 µs in the example of FIG. 4.

Similarly to the example shown in FIG. 4, wherein the audio sampling timing is corrected to run faster, when the audio sampling timing is corrected to run slower, at the adjustment timing, the controller 119 does not begin to count the next audio sampling timing until a corrected symbol timing is inputted from the demodulator 107 even when 125 µs elapses, and, upon receiving the symbol timing, begins to count with the next audio sampling timing in synchronization with the corrected symbol timing of the wireless frame while outputting demodulated data.

(Operation in Audio Sampling Timing Adjustment: FIG. 1)

Next, an operation of the demodulator 107, the controller 119 and the audio codec 118 in the audio sampling timing adjustment will be described with reference to FIG. 1.

(Audio Sampling Timing Adjustment at Receiving Stage)

First, an operation of the audio sampling timing adjustment at a receiving stage will be described. The demodulator 107 detects a symbol timing of a received wireless frame, demodulates received data and outputs the demodulated data and the detected symbol timing of the wireless frame to the controller 119.

Upon receiving the demodulated data and the detected symbol timing of the wireless frame from the demodulator 107, the controller 119 stores the demodulated data in the buffer 121a and outputs a symbol timing of the wireless frame generated within the controller 119 to the demodulator 107.

The demodulator 107 detects a timing deviation by comparing both timings and determines the adjustment timing frequency and the adjustment timing at which the wireless frame symbol timing and the audio frame sampling timing are corrected.

The determination of the adjustment timing is described in detail. Upon detecting a deviation of the wireless frame, the demodulator 107 compares the deviation with the margin of the time interval (7.35 μs) generated by a forward-moved reference clock for output of data to the audio codec 118 and determines the correction frequency (the adjustment timing frequency) such that the one-time correction amount at the adjustment timing falls within the margin of the time interval.

That is, in order to absorb the deviation within 7.35 μs per correction, the demodulator 107 calculates how often the correction needs to be performed between the symbol timings and determines the adjustment timing frequency and the adjustment timing based on the adjustment timing frequency. This allows the correction to be ended within the margin of the time interval even when the audio sampling timing needs to arrive earlier, which results in prevention of missing of the audio data.

If the deviation is large, the adjustment timing is determined to adjust the symbol timing and the audio sampling timing at every time at which the wireless frame symbol timing synchronizes with the audio frame sampling timing (as shown in FIG. 2). On the other hand, if the deviation is small, the number of adjustment of the symbol timing and the audio sampling timing is reduced to, e.g., ½ of that shown in FIG. 2, with ½ of the adjustment frequency in FIG. 2, as the adjustment timings shown in FIG. 4. Then, the demodulator 107 informs the controller 119 of the determined adjustment timing.

When the adjustment timing (e.g., symbol timing count 5, 11, 17, . . . ) arrives, the demodulator 107 corrects the symbol timing of the wireless frame, as shown in FIG. 4. Then, the corrected symbol timing is outputted to the controller 119.

The controller 119 first outputs the demodulated data stored in the buffer 121a to the audio data decoder 108 in accordance with the audio sampling timing generated in the controller 119. That is, the controller 119 outputs the demodulated data every 125 μs normally.

Further, the controller 119 supplies the forward-moved reference clock shown in FIG. 4 to the audio data decoder 108 and the audio data encoder 115 in the audio codec 118, and, in the audio codec 118, an audio decoding process is performed on the inputted demodulated data based on the forward-moved reference clock to output them to the D/A converter 109.

Then, when the adjustment timing (e.g., audio sampling timing count 4, 9, 14, . . . ) sent from the demodulator 107 arrives, the controller 119 waits for the symbol timing of the wireless frame inputted from the demodulator 107. When the symbol timing is inputted, the controller 119 outputs the next demodulated data and forward-moved reference clock from the buffer 121a by counting the next audio sampling timing by the audio sampling counter in synchronization with the input of the symbol timing. The symbol timing inputted from the demodulator 107 is a symbol timing resulted from the wireless frame deviation correction. This allows the sampling timing of the audio frame to be synchronized with the symbol timing of the wireless frame, as shown in FIG. 3.

For example, as shown in FIG. 4, when a timing is set to run faster, although counting for the adjustment timing has not yet arrived at 125 μs, the next audio sampling timing is counted to output the next demodulated data when the symbol timing of the wireless frame is inputted from the demodulator 107. Since a portion excluded by the adjustment is within the margin of the time interval, audio data will not be lost, thereby not affecting the quality of received audio.

When a timing is set to run slower, even when counting for the adjustment timing exceeds 125 μs, counting the next audio sampling time is deferred until the symbol timing from the demodulator 107 is inputted. When the symbol timing of the wireless frame is inputted from the demodulator 107, the next audio sampling timing is counted to output the next demodulated data.

(Audio Sampling Timing Adjustment at Transmitting Stage)

Next, an operation of the audio sampling timing adjustment at a transmitting stage will be described. The audio data encoder 115 of the audio codec 118 performs encoding based on the forward-moved reference clock provided from the controller 119 and outputs encoded data to the buffer 121b of the controller 119. The controller 119 reads the encoded data from the buffer 121b in accordance with the audio sampling timing and outputs the read data to the modulator 114 of the wireless frame. At this time, the controller 119 outputs the audio encoded data to the modulator 114 by synchronizing the audio sampling timing with the wireless frame symbol timing inputted from the demodulator 107 at the adjustment timing count.

When the audio frame timing is corrected to run faster, although the counting for the adjustment timing has not yet arrived at 125 μs, the next audio sampling timing is counted and the next encoded data is outputted to the modulator 114 when the symbol timing of the wireless frame is inputted from the demodulator 107. A portion not counted in the adjustment timing falls within the margin of the time interval without the audio data, which does not affect the audio quality.

When the audio frame timing is corrected to run slower, although the counting for the adjustment timing exceeds 125 μs, counting the next audio sampling timing is deferred until the symbol timing from the demodulator 107 is inputted. When the symbol timing of the wireless frame is inputted from the demodulator 107, the next audio sampling timing is counted and the encoded data is outputted to the modulator 114. This allows the audio sampling timing to be synchronized with the wireless frame symbol timing at the transmitting stage.

(Effects of the Embodiment)

In the audio frame timing correction method and wireless device in accordance with the embodiment of the present invention, the demodulator 107 detects a symbol timing of a received wireless frame, demodulates data to output them to the controller 119, detects deviation of wireless frame by comparing the detected symbol timing with a symbol timing of the device itself inputted from the controller 119, determines the frequency for correcting the timings of the wireless frame and an audio frame and adjustment timings to notify the controller 119 thereof, and performs symbol timing correction when the adjustment timing arrives to output the corrected symbol timing to the controller 119. The controller 119 generates a reference signal of the audio codec to be moved forward within an audio sampling interval with a margin of the time interval at the rear end of the audio sampling interval, stores the demodulated data inputted from the demodulator 107 in the buffer 121a, outputs the stored demodulated data to the audio codec 118 at the audio sampling timing, synchronizes the audio sampling timing with the corrected symbol timing inputted from the demodulator 107 at the adjustment timing notified by the demodulator 107 to output the next demodulated data to the audio codec 118.

Therefore, even when a deviation of the wireless frame timing from that of a counterpart occurs, the audio frame timing can be synchronized with the wireless frame timing. Further, the adjustment timing is set such that the deviation can be corrected in the margin of the time interval within the audio sampling interval, thereby preventing missing of audio data even when the audio sampling interval is corrected to be shortened. Accordingly, without increasing the circuit scale, it is possible to prevent deterioration of the audio quality and to realize excellent audio communications with a simple control.

Further, in the audio frame timing correction method and wireless device in accordance with the embodiment of the present invention, the audio data encoder 115 in the audio codec 118 encodes an audio signal to output encoded audio data to the controller 119 at the forward-moved reference clock, and the controller 119 stores the encoded audio data into the buffer 121*b*, outputs the stored audio data to the modulator 114 at the audio sampling timing, and outputs the next encoded audio data stored to the modulator 114 by synchronizing the audio sampling timing with the corrected symbol timing inputted from the demodulator 107. Therefore, the audio frame timing can be synchronized with the wireless frame timing, and missing of audio data can be prevented even when the audio sampling interval is corrected to be shortened. Accordingly, without increasing the circuit scale, it is possible to prevent deterioration of the audio quality and to realize excellent audio communications with a simple control.

INDUSTRIAL APPLICABILITY OF THE INVENTION

The present invention can be suitably employed for an audio frame timing correction method and a wireless device, which are capable of adjusting an audio frame timing to a wireless frame timing, while preventing loss of audio data with a simple control, without increasing a circuit scale.

What is claimed is:

1. An audio frame timing correction method for correcting an audio frame timing based on a wireless frame timing, comprising:
   determining an adjustment timing at which correction for synchronizing an audio data counting timing of an audio frame with a symbol counting timing of a wireless frame is performed;
   making a reference clock for encoding or decoding audio data to run fast and be moved forward within an audio data counting interval to form a remaining time within the audio data counting interval as timing correctable margin of the time interval;
   decoding or encoding the audio data with the reference clock moved forward to form the margin of the time interval; and
   synchronizing the audio data counting timing of the audio frame with the symbol counting timing of the wireless frame when the adjustment timing arrives.

2. The audio frame timing correction method of claim 1, further comprising:
   detecting a wireless frame deviation;
   determining the adjustment timing based on the deviation;
   correcting the symbol counting timing of the wireless frame based on the deviation; and
   synchronizing the audio data counting timing of the audio frame with the corrected symbol counting timing of wireless frame.

3. The audio frame timing correction method of claim 2, wherein a frequency of the adjustment timings determines the adjustment timing frequency such that the one-time correction amount at the adjustment timing falls within the margin of the time interval.

4. A wireless device which demodulates a received wireless signal and decodes demodulated audio data, comprising:
   a controller configured to generate a symbol timing of a wireless frame and an audio data sampling timing of an audio frame, store the demodulated audio data, make a reference clock for decoding the audio data to run fast and be moved forward within an audio data counting interval to form a remaining time within the audio data counting interval as a timing correctable margin of the time interval, and output the reference clock moved forward to form the margin of the time interval and the stored audio data at the audio data counting timing of the audio frame;
   a demodulator configured to detect a symbol timing of a wireless frame of the received wireless signal, detect a wireless frame deviation by comparing the detected symbol timing of the wireless frame with the symbol timing of the wireless frame generated by the controller, determine an adjustment timing to correct the audio frame timing based on the deviation, correct the symbol counting timing of the wireless frame based on the deviation, demodulate the wireless signal, and output the demodulated audio data to the controller; and
   an audio data decoder configured to receive the audio data and the reference clock moved forward to form the margin of the time interval from the controller, and decode the audio data with the reference clock,
   wherein the controller synchronizes the audio data counting timing of the audio frame with the corrected symbol counting timing of the wireless frame when the adjustment timing determined by the demodulator arrives.

5. The wireless device of claim 4, further comprising:
   an audio data encoder configured to encode an audio signal with a reference clock to output the audio data; and
   a modulator configured to modulate the encoded audio data to output the modulated audio data in a wireless frame,
   wherein the controller makes the reference clock for encoding the audio data to run fast and be moved forward within an audio data counting interval to form a remaining time within the audio data counting interval as a timing correctable margin of the time interval, outputs the reference clock moved forward to form the margin of the time interval to the audio data encoder, stores the audio data outputted from the audio data encoder, outputs the stored audio data at an audio data counting timing of an audio frame, and synchronizes the audio data counting timing of the audio frame with the symbol counting timing of the wireless frame when the adjustment timing determined by the demodulator arrives.

6. The wireless device of claim 4, wherein the demodulator determines the adjustment timing frequency such that the one-time correction amount at the adjustment timing falls within the margin of the time interval.

* * * * *